(12) United States Patent
Hoppe

(10) Patent No.: US 12,649,362 B2
(45) Date of Patent: Jun. 9, 2026

(54) HOUSING PART

(71) Applicant: ZF Friedrichshafen AG,
Friedrichshafen (DE)

(72) Inventor: Ronny Hoppe, Oberteuringen (DE)

(73) Assignee: ZF Friedrichshafen AG,
Friedrichshafen (DE)

( * ) Notice: Subject to any disclaimer, the term of this
patent is extended or adjusted under 35
U.S.C. 154(b) by 0 days.

(21) Appl. No.: 19/239,247

(22) Filed: Jun. 16, 2025

(65) Prior Publication Data

US 2025/0381841 A1 Dec. 18, 2025

(30) Foreign Application Priority Data

Jun. 17, 2024 (DE) .................... 10 2024 205 552.2

(51) Int. Cl.
*B60K 17/04* (2006.01)
*B60K 17/24* (2006.01)

(52) U.S. Cl.
CPC .............. *B60K 17/04* (2013.01); *B60K 17/24*
(2013.01)

(58) Field of Classification Search
CPC ................................ B60K 17/04; B60K 17/24
USPC ................................. 180/346, 352, 374, 377
See application file for complete search history.

(56) References Cited

U.S. PATENT DOCUMENTS 5,042,321 A * 8/1991 Hongo .................... F16H 57/03
74/606 R
5,174,541 A 12/1992 Hutter et al.

6,457,546 B1 * 10/2002 Ishimaru .............. A01D 69/002
60/487
6,622,825 B2 * 9/2003 Iida .......................... F16H 39/14
184/6.25
7,493,999 B2 * 2/2009 Reed .................... F16H 63/3416
192/219.5
7,658,128 B2 * 2/2010 Sugano ................ B60K 17/344
74/606 R
11,679,657 B1 * 6/2023 Atqiaee ................ B60K 17/165
475/150
12,003,164 B2 6/2024 Tan
2020/0127527 A1 * 4/2020 Nakamatsu ............ H02K 7/116
2021/0006127 A1 * 1/2021 Chen ...................... B60K 11/06
2022/0149701 A1 * 5/2022 Nakamatsu .............. H02K 5/20
2023/0128748 A1 * 4/2023 Umerley ................ B60K 17/16
180/65.1

OTHER PUBLICATIONS

German Patent Office, Office Action issued in German Patent
application No. 10 2024 205 552.2 (Jan. 9, 2025).

* cited by examiner

*Primary Examiner* — Toan C To
(74) *Attorney, Agent, or Firm* — Secant IP, PLLC

(57) ABSTRACT

A housing element (7) for a transmission of a motor vehicle
one more connecting flange (13), where the connecting
flange (13) is designed to be fixed to a support member of
the motor vehicle in order to fix the transmission to the
motor vehicle. The connecting flange (13) has a free end
section (18) having an end contact area (21) for contacting
the support member. The end contact area (21) is of a size
such that a force exerted on the support member of the motor
vehicle deforms the support member only elastically but not
plastically. The housing element has four such connecting
flanges in one example.

9 Claims, 8 Drawing Sheets

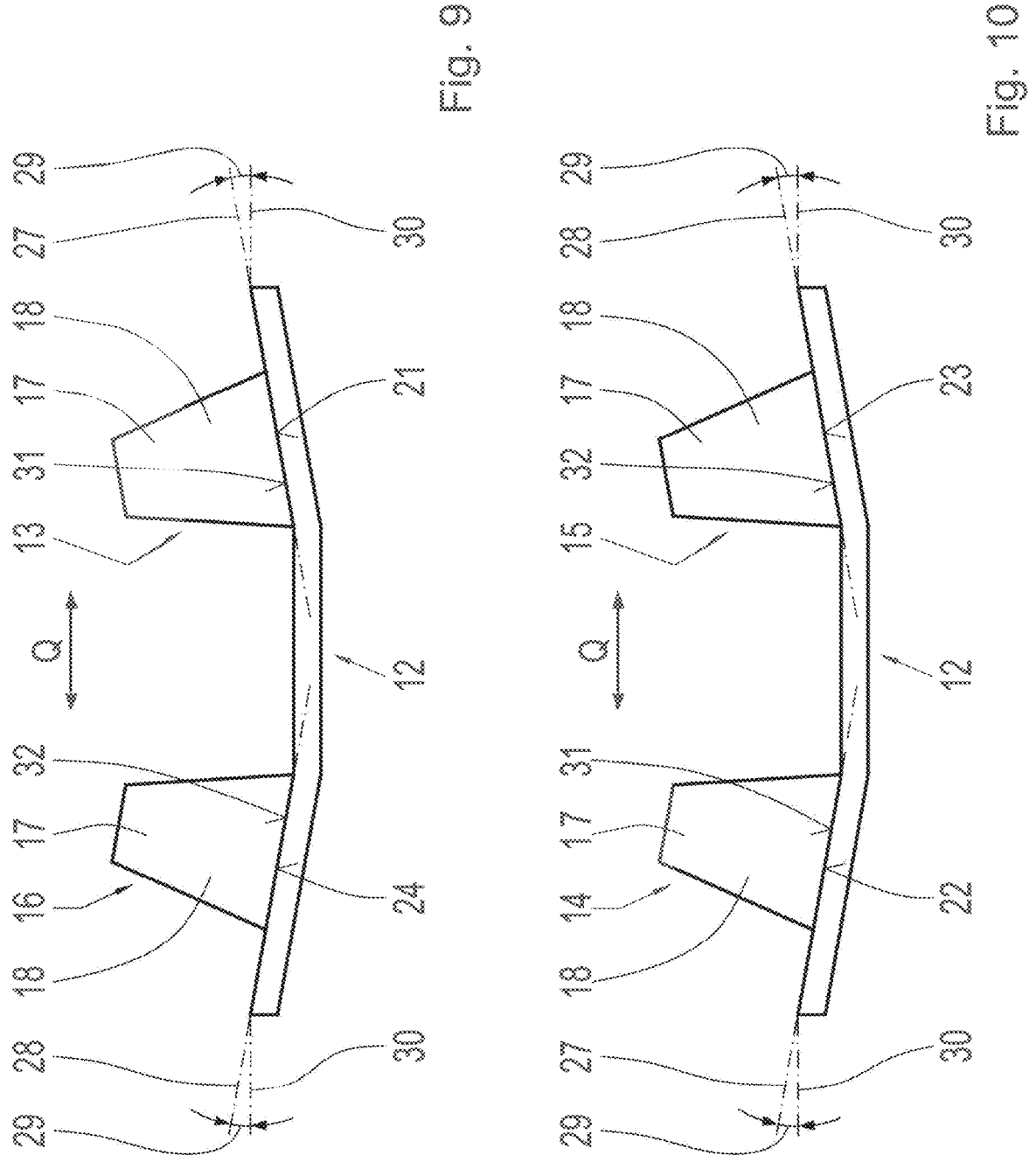

HOUSING PART

RELATED APPLICATIONS

This application claims the benefit of and right of priority under 35 U.S.C. § 119 to German Patent Application no. 10 2024 205 552.2, filed on 17 Jun. 2024, the contents of which are incorporated herein by reference in its entirety.

FIELD OF THE DISCLOSURE

The invention relates to a housing element for a transmission of a motor vehicle.

BACKGROUND

It is known to mount a housing arranged on the drive output side of a motor/transmission assembly group on a cross-member of a vehicle chassis. Until now the diameters of screw fixing points on housings are made approximately cylindrical. If the cross-member is too soft, then with a conventional design edge supports of the screw fixing points may be provided.

U.S. Pat. No. 5,174,541 A shows an assembly device with two fixing sections, one of which is connected to a transmission section of a motor/transmission assembly group and the other to a chassis element of a vehicle, wherein the fixing sections rotate relative to one another about an axis which extends normally relative to the plane of an inclination of the motor-transmission assembly group, while this is mounted on the vehicle and during the subsequent operation of the vehicle. A stationary cylindrical tubular sleeve surrounds a rubber insulator that can rotate inside the sleeve. One of the fixing sections of the assembly device is connected to the rubber insulator and rotates with it, whereby the angular position of the motor-transmission relative to the vehicle is varied.

SUMMARY

A purpose of the present invention can be regarded as providing a fixing technology which, in particular, avoids edge supports. This objective is achieved by a housing part as variously disclosed herein. Advantageous embodiments will be apparent from the following description and the figures.

According to the present invention, a housing element is proposed. The housing element can be made, for example, of an aluminum material, in particular by an aluminum pressure diecasting method. The housing element can accommodate assemblies of a transmission, in particular an automatic transmission. Compared with the prior art, the present disclosure produces a larger contact area of the housing element of screw fixing points in particular, by increasing the size of a diameter in the contact surface. In that way edge supports of the screw fixing points can be safely avoided.

In this connection, according to one aspect of the invention a housing element for a transmission of a motor vehicle is provided. A motor vehicle is a vehicle which is driven by a motor or drive system of its own and which is able to transport people or freight over streets or other surfaces that can be driven upon. Motor vehicles can be of various types, such as passenger cars, trucks, buses, motorcycles, etc. They are an essential part of the modern transport system. A transmission is a mechanical device which is used to vary the rotation speed and the torque between a source of drive power (such as a motor) and a driven device (such as the wheels of a motor vehicle). It enables the selection and adaptation of transmission ratios so as to adapt the power of the drive input optimally to the driving situation at the time. A bousing element is part of a housing. A housing is a structural component of a mechanical system which serves to support, surround or accommodate other parts of the system. In the case of a transmission for a motor vehicle, a housing element can be an external cladding or housing which surrounds and protects the internal components of the transmission.

The housing element can comprise a first connecting flange. A screw fixing point or connecting flange is a specific structural component of a housing element, particularly in the context of transmissions for motor vehicles. The connecting flange serves to connect the transmission to other parts of the vehicle chassis or the vehicle body, such as a cross-member. The connecting flange is typically provided with threaded bores or other ng means in order to enable assembly by the tightening of screws or bolts. The use of connecting flanges ensures firm and secure fixing of the transmission onto the vehicle chassis, which favors efficient force transfer and a stable vehicle structure. The housing element can comprise more than one connecting flange. Later on, an embodiment with four connecting flanges is described. The "first" connecting flange is then one of the four connecting flanges.

It can be provided that the first connecting flange is designed to be connected to a support member of the motor vehicle in order to fix the transmission onto the motor vehicle. Furthermore, it can be provided that the first connecting flange has a free end section. In addition, it can be provided that the free end section has a first contact surface at the end for contacting the support member. Furthermore, it can be provided that the first contact surface at the end is large enough to ensure that a force applied to the support member of the motor vehicle deforms the support member only elastically and not plastically. This ensures a more uniform transfer of transverse forces into the cross-member. In this connection the housing can in particular be designed in such manner that part of the transverse force can be taken up by the housing element. In that way edge supports can be avoided.

The inventors have found that a surface pressure is not in the plastic range if the contact area is circular or annular, such that the size of an outer diameter of the contact area is at least 32 millimeters. In this connection, in an embodiment it is provided that the first end contact area has an annular cross-section. The connecting flange has a central bore to receive a screw or bolt. In the first end contact area this results in a central aperture surrounded by a ring, which forms the effective fact area. The ring has an optimal ratio between its circumference and its area. Furthermore, it is provided that the annular cross-section has an outer diameter of at least 32 millimeters. Alternatively, to the annular cross-section, oval or irregular geometries of the contact area can also be used, for example, when the geometry is different due to a mould division.

Furthermore, a cylindrical screw fixing point or a cylindrical first connecting flange can be used. In this connection, according to an embodiment it is provided that the first connecting flange has an inner section. Moreover, it is provided that the inner section is arranged in a radial direction closer to a drive output shaft than is the free end section. The inner section can merge with the free end from the inside outward in the radial direction. Furthermore, this embodiment is characterized in that the inner section has an annular cross-section. Moreover, it is provided that the inner section has the same outer diameter as the free end section. In that way acceptable stresses can be produced at the edges of the contact area. It can be taken into account that, due to the greater amount of material used in the area of the inner section of the first connecting flange, the weight will be relatively greater. Furthermore, owing to the associated material accumulation this embodiment is not free from the risk of porosity.

To overcome these problems, it is proposed to make the free end section in an "elephant-foot" design. A geometric shape of the elephant foot is produced when on the one band the first end contact area has a diameter as large as possible in order to reduce the surface pressure. On the other hand, the inner section or cylindrical portion is as small or thin as possible, in order to minimize or at least reduce the risk of porosity. The background here is that, for example, with a 32-millimeter large outer diameter of the contact area, when the inner section is designed cylindrically, material accumulations are produced which can lead to porosity. Thus, it can be advantageous if only the lower area or the free end section and its contact area are enlarged, but not the inner area of the first connecting flange. This gives the elephant-foot design. In this connection, according to an embodiment it is provided that the first connecting flange has an inner section. Furthermore, it is provided that the inner section is arranged closer in a radial direction to a drive output shaft than is the free end section. Moreover, this embodiment is characterized in that the inner section has an annular cross-section. In addition, it is also provided that the inner section has a smaller outer diameter than the free end section. In that way an increased risk of porosity can be avoided. Furthermore, the screw fixing point can be designed appropriately for casting. Moreover, it is advantageous that overall, a lighter cross-member can be used since it does not have to be additionally reinforced. In this connection a contribution toward reducing the weight gain is made. In particular the technology proposed entails no weight gain at all or only a minimal weight gain.

In particular the housing element can have four of the connecting flanges described in this disclosure, in order to ensure a particularly stable and durable fixing onto the support of the motor vehicle. In particular the connecting flanges or their contact areas can be orientated in pairs in such manner that corresponding contact areas of the support of the motor vehicle can be contacted. In this connection, according to an embodiment it is provided that the housing element also comprises a second connecting flange according to any of the preceding claims, a third connecting flange according to any of the preceding claims, and a fourth connecting flange according to any of the preceding claims. This embodiment is in particular characterized in that the first end contact area of the first connecting flange and a second end contact area of a second connecting flange extend in a first common plane. Moreover, it is provided that a third end contact area of the third connecting flange and a fourth end contact area of the fourth connecting flange extend in a second common plane. In addition, this embodiment is characterized in that in correspondence with two contact areas of the support, the first common plane and the second contact plane extend at an angle relative to one another.

Particularly advantageously, the housing element can be used on a drive output side of an automatic transmission. In this connection, according to an embodiment, it can be provided that the transmission is an automatic transmission. The motor vehicle can be in particular a passenger car or a utility vehicle such as a truck. Furthermore, it is provided that the housing element is arranged on a drive output side of the transmission. Moreover, this embodiment is characterized in that the housing element closes the transmission on the drive output side.

The automatic transmission can be fitted in the motor vehicle longitudinally, and in that case the support extends transversely in the motor vehicle ("cross-member"). In this connection, according to an embodiment it is provided that a drive output shaft of the transmission is arranged in a longitudinal direction of the motor vehicle. Furthermore, it is provided that the support is arranged transversely to the longitudinal direction.

A length of the inner section of the first connecting flange can in particular be between 18 and 20 millimeters. A length of the free end of the first connecting flange can in particular be between 13 and 15 millimeters. In this connection, according to an embodiment it is provided that the inner section extends in the radial direction between 18 and 20 millimeters. Furthermore, it is provided that the free end extends in the radial direction between 13 and 15 millimeters. Moreover, a width of the inner section of the first connecting flange can in particular be between 20 and 25 millimeters, for example 22 millimeters. In this connection, in an embodiment it is provided that the inner section extends transversely to the radial direction between 20 and 25 millimeters.

Furthermore, it can be advantageously provided that starting from the inner section the outer diameter increases and reaches its maximum value within the free end section. In this connection, according to an embodiment, it is provided that the outer diameter of the inner section increases in the radial direction toward the free end section until it reaches a value of 32 millimeters in the first contact area. In that way abrupt transitions are avoided, which could lead to stress peaks within the connecting flange. The outer diameter can increase steadily, i.e., along a straight line that extends in the outer surface of the inner section and the free end section of the first connecting flange. Alternatively, the diameter can also increase along a curved line, for example an outward-orientated curve.

BRIEF DESCRIPTION OF THE DRAWINGS

Below, example embodiments of the invention are explained in greater detail with reference to the schematic drawings, wherein the same or similar elements are denoted by the same indexes, and which show.

FIG. 6: Stresses (in megapascals MPa) in two end contact areas of two connecting flanges of the housing element in FIG. 4, FIG. 7: A perspective view of a second example of a housing element for the transmission in FIG. 1, FIG. 8: Stresses (in megapascals MPa) in two end contact areas of two connecting flanges of the housing element in FIG. 7, FIG. 9: A schematic front view of a third example of part of a housing element in the area of a first and second connecting flange, and FIG. 10: A schematic rear view of the housing element in FIG. 9.

DETAILED DESCRIPTION

Figure 1:
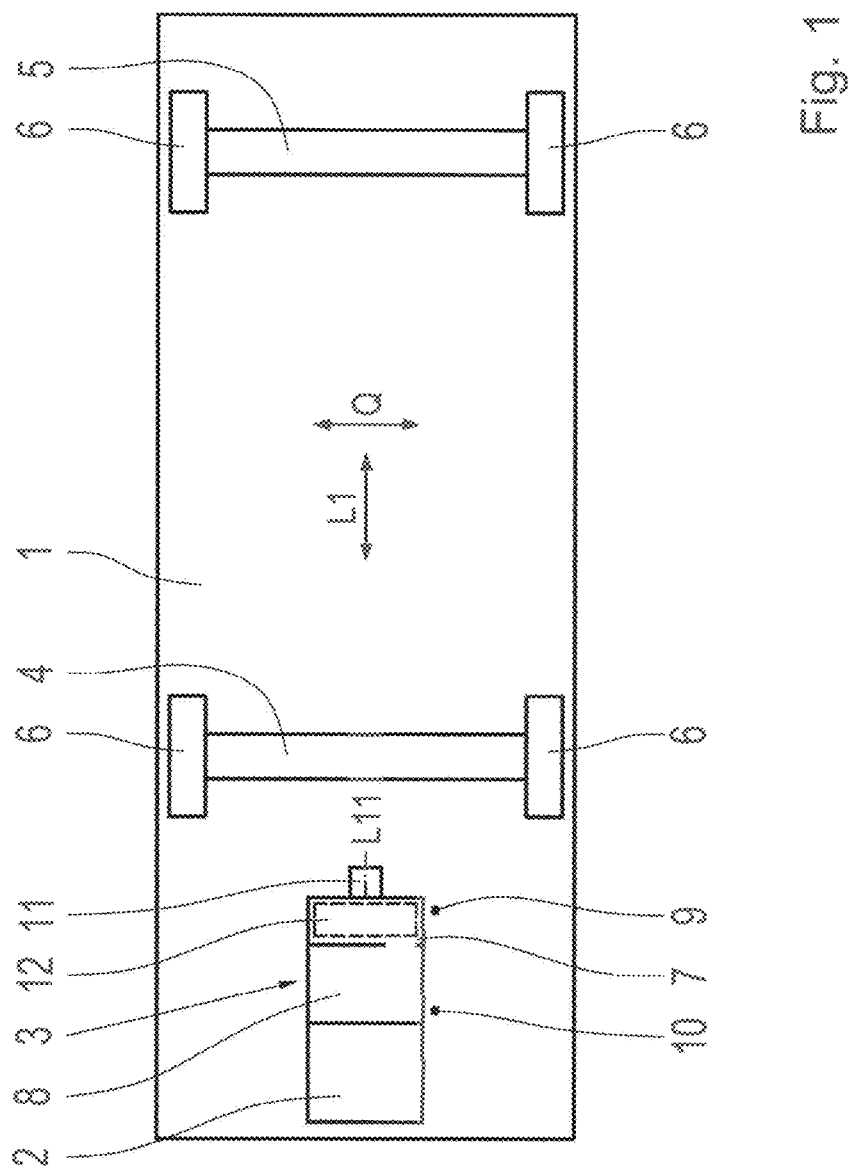
FIG. 1: A view from above, of a motor vehicle with a transmission fixed onto a support member of the motor vehicle.

FIG. 1 shows a motor vehicle 1. The motor vehicle 1 can be a passenger car or a utility vehicle such as a truck, for example. The motor vehicle 1 comprises a motor 2, which can for example be an internal combustion engine or an electric motor. In addition, the motor vehicle 1 comprises a transmission 3, which can be an automatic transmission. By way of the transmission 3 and further assemblies (not shown), such as cardan shafts and a differential gear system, the motor 2 can drive a front axle 4 and/or a rear axle 5 of the motor vehicle 1. On the front axle 4 and the rear axle 5, in each case, at least one wheel 6 is fitted on each side.

The automatic transmission comprises a housing element 7 which, together with a further bousing element 8, accommodate components of the transmission 3 (for example gearsets and shifting elements, not shown), and enclose the transmission 3 on the outside and thereby protect the components. The housing element 7 is arranged on a drive output side 9 of the transmission 3. The further housing element 8 is on a drive input side 10 of the transmission 3. The drive input side 10 faces toward the side on which the motor 2 is located. The drive output side 9 is the side that faces away from the side on which the motor 2 is located. On the drive output side 9 the transmission 3 has a drive output shaft 11. The drive output shaft 11 rotates about its longitudinal axis L11 and delivers an output torque which can be transmitted to the front axle 4 and/or to the rear axle 5.

When the motor vehicle 1 is driving straight ahead or in reverse, i.e., without deflected wheels, then it moves in a longitudinal direction L1. The longitudinal axis L11 of the drive output shaft 11 can in particular extend collinearly with (as in the example embodiment shown in FIG. 1), or parallel to the longitudinal direction L1. The housing element 7 is fixed to a support member 12 of the motor vehicle 1. The support member 12 can be part of a chassis of the motor vehicle 1, no more of which is shown. The support member 12 can extend farther in a transverse direction Q than in the longitudinal direction L1. The transverse direction Q extends transversely to the longitudinal direction L1 and in particular in the horizontal direction. The support member 12 can in this case be called a "cross-member".

Figure 2:
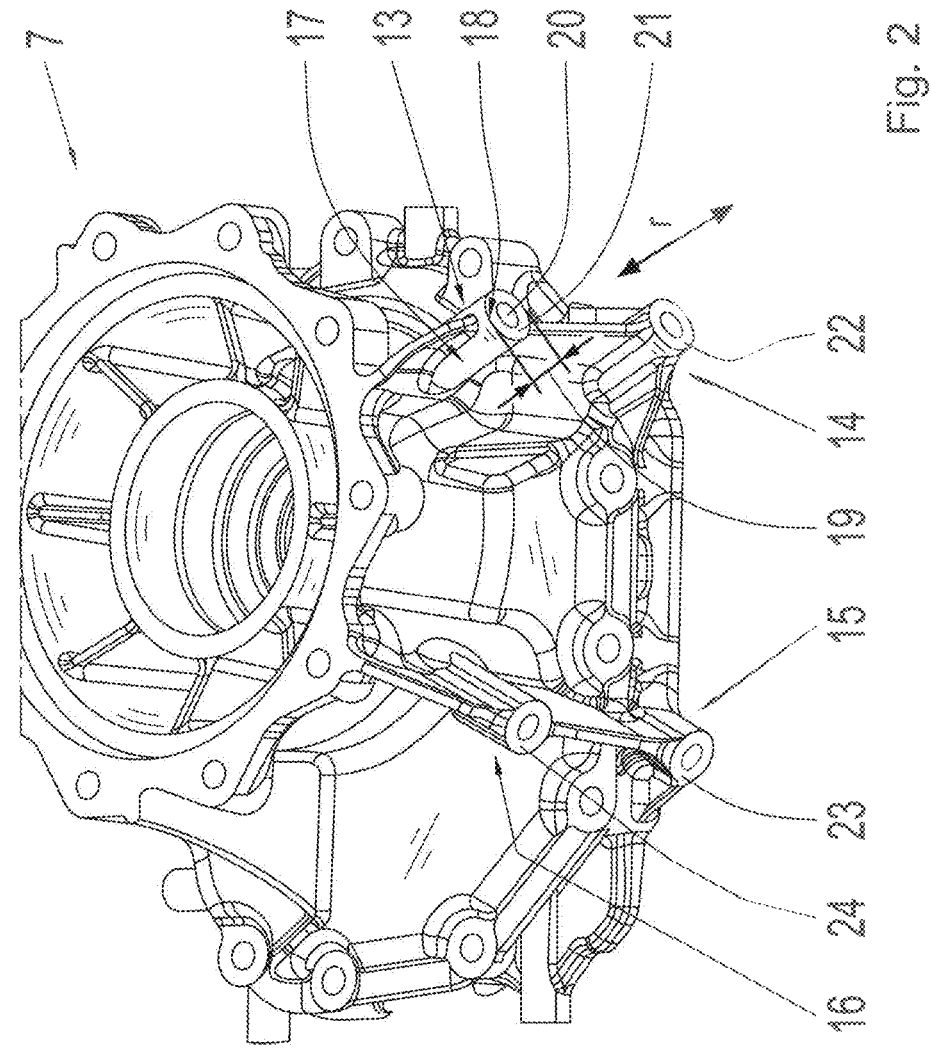
FIG. 2: A perspective view of a first example of a housing element for the transmission in FIG. 1, FIG. 3: Stresses (in megapascals MPa) in two end contact areas of connecting flanges of the connecting flange in FIG. 2, FIG. 4: A perspective view of a second example of a housing element for the transmission in FIG. 1, FIG. 5: An alternative perspective view of the housing element in FIG. 4, in the area of a connecting flange.

FIG. 2 shows a known housing element 7. The housing element 7 comprises a first connecting flange 13, a second connecting flange 14, a third connecting flange 15, and a fourth connecting flange 16. In the example shown in FIG. 2, the four connecting flanges 13 to 16 are similarly designed, i.e., each has a cylindrical inner section 17 and a free end section 18. In FIG. 2, for reasons of greater clarity only, the inner section 17 and the free end section 18 of the first connecting flange 13 are indexed. In what follows, it is mainly the first connecting flange 13 that is described, but the corresponding statements also apply analogously to the other three connecting flanges 14 to 16 as well.

The inner section 17 and the free end section extend in a radial direction r of the drive output shaft 11 (not shown in FIG. 2—see FIG. 1). In the example shown in FIG. 2, the inner section 17 and the free end section 18 each have an annular cross-section with the same outer diameter 19. In the example shown in FIG. 2, the outer diameter 19 is 22 millimeters. The cross-section is annular with a central bore 20 for receiving in particular a screw 33, which in particular can be of the size M8. By means of the screw 33 the housing element 7 can be fixed onto the support member 12 of the motor vehicle 1 (see FIGS. 1, 9, and 10).

When the housing element 7 is fixed to the support member 12, a first end contact area 21 of the first connecting flange 13 contacts a corresponding contact area 21 on the support member 12. The first end contact area 21 is arranged on the free end 18 and closes it off relative to the outside. That is what is meant by the term "end." Correspondingly, the second connecting flange 14 has a second end contact area 22, the third connecting flange 15 has a third end contact area 23, and the fourth connecting flange 16 has a fourth end contact area 24.

Figure 3:
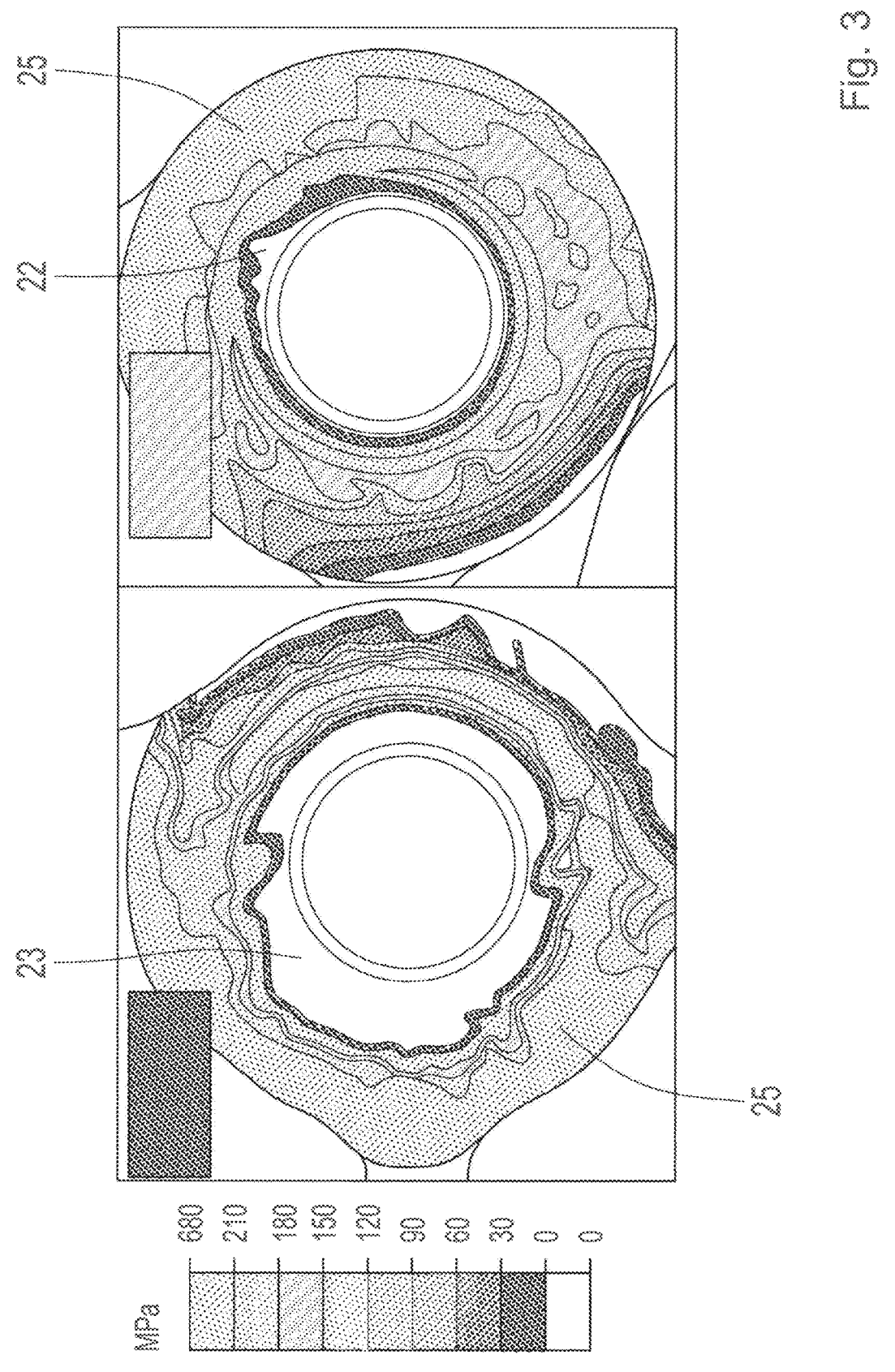

FIG. 3 shows examples of the four connecting flanges 13 to 16, on the right stresses within the second end contact area 22 of the second connecting flange 14, and on the left stresses within the third end contact area 23 of the third connecting flange 15. With the outer diameter 19 of 22 millimeters in this case, the risk of porosity in the four connecting flanges 13 to 16 is relatively low, since relatively little material has accumulated. The weight of the four connecting flanges 13 to 16 is correspondingly low. However, with the outer diameter 19 of 22 millimeters given in this case, the stresses at the edges of the four contact areas 21 to 24 adopt very high values, particularly in an edge area 25. In this edge area 25 the stress values can be so high that edge supports are needed in the contact areas 21 to 24 of the free end sections 13 to 16.

Figure 5:
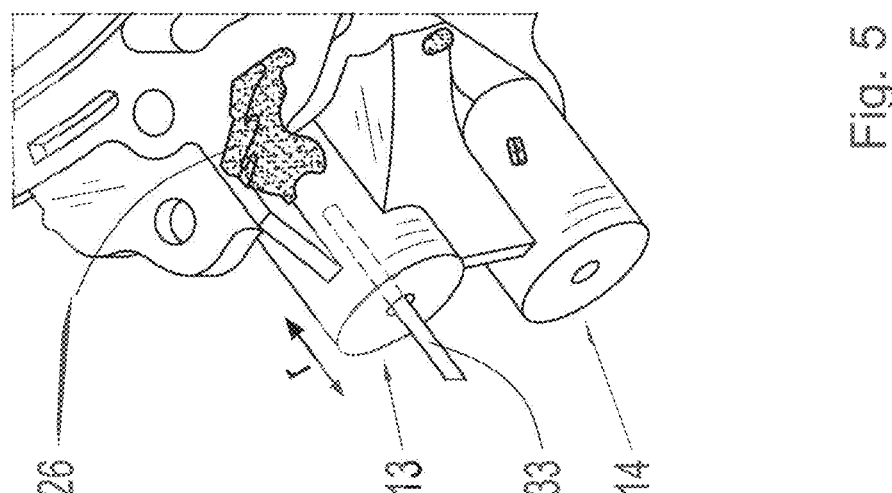
Figure 4:
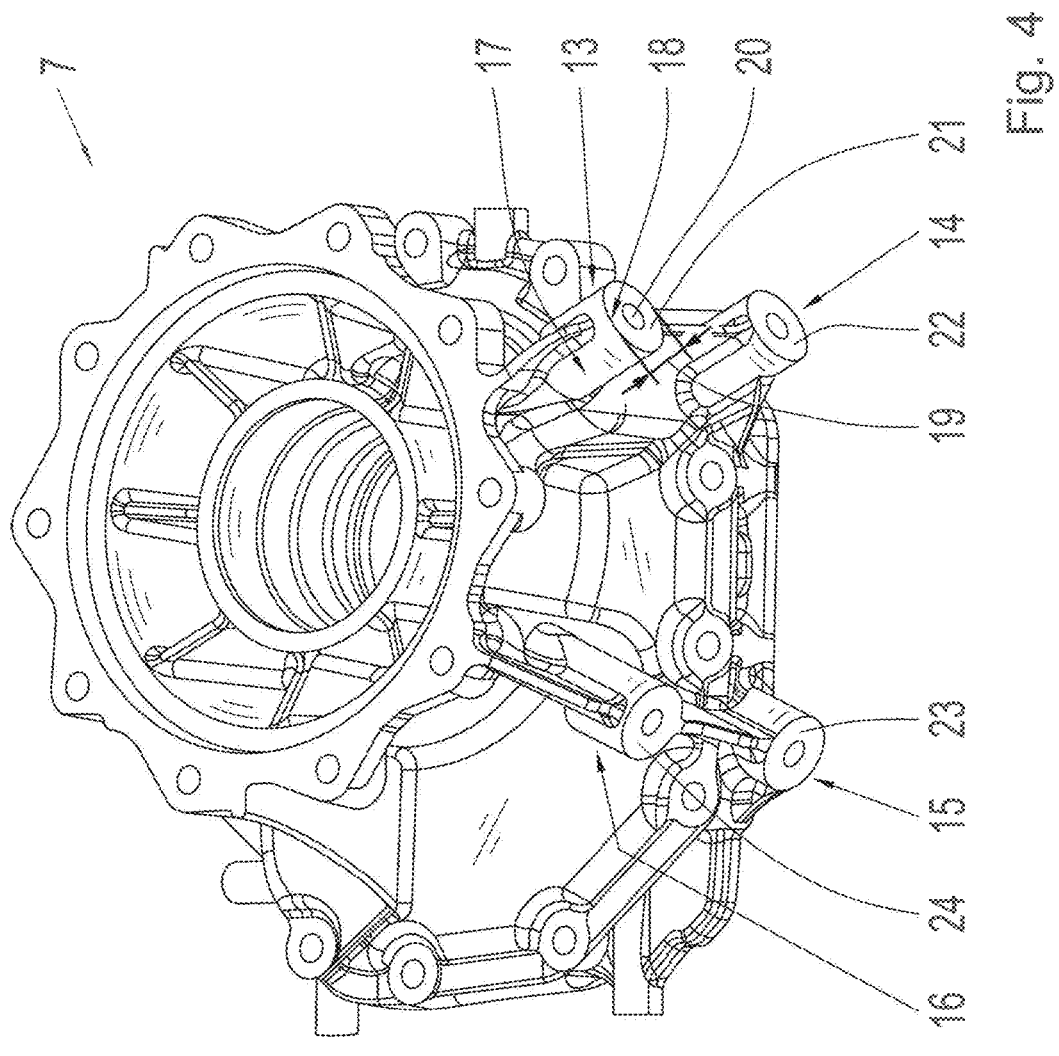

FIGS. 4 and 5 show a housing element 7 according to an example embodiment of the present invention. The housing element 7 has a first connecting flange 13, a second connecting flange 14, a third connecting flange 15, and a fourth connecting flange 16. In the example shown in FIGS. 4 and 5, the four connecting flanges 13 to 16 are all similarly designed, i.e., each has a cylindrical inner section 17 and a free end section 18. In FIG. 4, for reasons of greater clarity only, the inner section 17 and the outer free end section 18 of the first connecting flange 13 are indexed. In what follows, it is mainly the first connecting flange 13 that is described, but the corresponding statements apply analogously to the three further connecting flanges 14 to 16 as well.

The inner section 17 and the free end section 18 extend in a radial direction r of the drive output shaft 11 (not shown in FIGS. 4 and 5—see FIG. 1). In the example shown in FIGS. 4 and 5, the inner section 17 and the free end section 18 in each case have an annular cross-section with the same outer diameter 19. In the example shown in FIGS. 4 and 5, the outer diameter 19 is 32 millimeters, i.e., 10 millimeters more than in the example embodiment shown in FIG. 2. The cross-section is annular, with a central bore 20 for receiving, in particular, a screw 33 shown clearly in FIG. 5, which in particular can be size M8. By means of the screw 33, the housing element 7 can be fixed to the support member 12 of the motor vehicle 1 (see FIGS. 1, 9 and 10).

FIG. 6 shows an example of the four connecting flanges 13 to 16, on the right the stresses within the second end contact area 22 of the second connecting flange 14, and on the left the stresses within the third end contact area 23 of the third connecting flange 15. With the outer diameter 19 of 32 millimeters in this case, a risk of porosity in the four connecting flanges 13 to 16 is relatively high since, relatively, substantial material accumulation takes place. As an example, in FIG. 5 an accumulation of material 26 is indicated. Moreover, the weight of the four connecting flanges 13 to 16 is correspondingly high. However, given the outer diameter 19 of 32 millimeters, the stresses at the edges of the four contact areas 21 to 24 adopt relatively moderate values, particularly in an edge area 25. In the edge area 25 the stress values are low enough for there to be no need for edge supports in the contact areas 21 to 24 of the free end sections 13 to 16.

Figure 7:
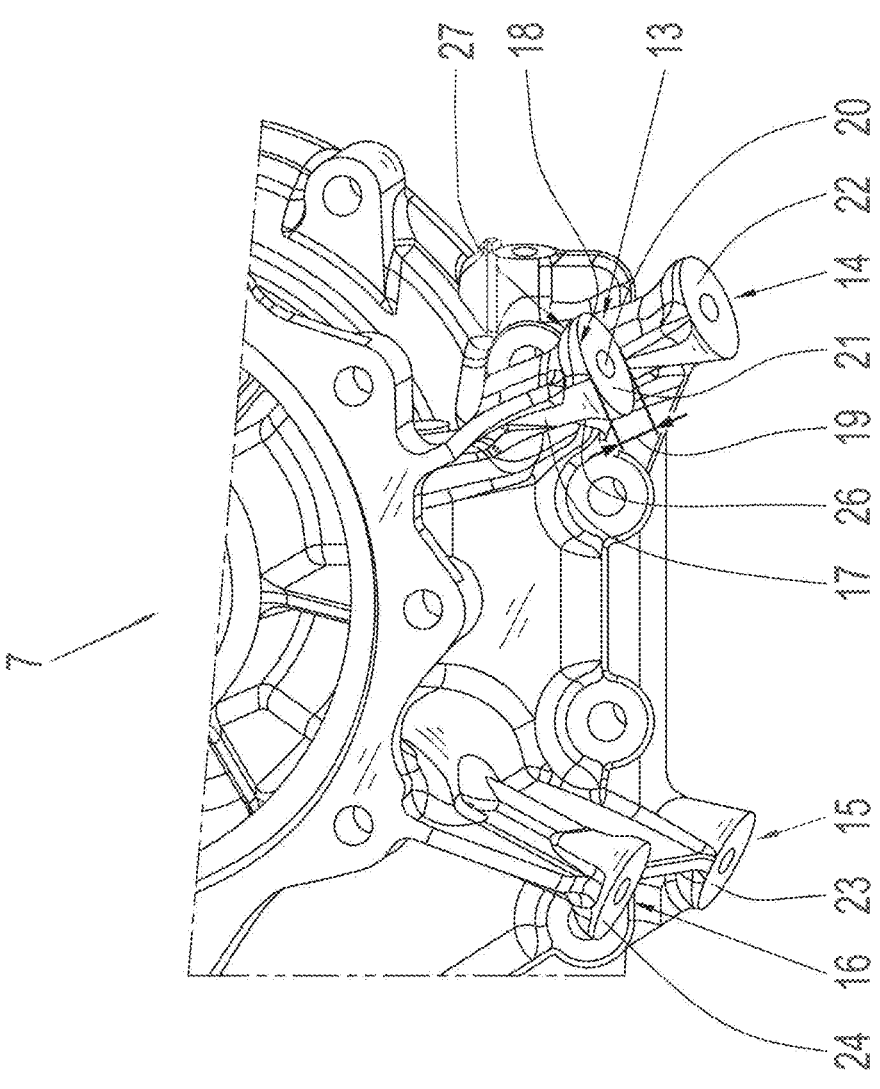

FIG. 7 shows a housing element 7 according to a further example embodiment of the present invention. The housing element 7 comprises a first connecting flange 13, a second connecting flange 14, a third connecting flange 15, and a fourth connecting flange 16. In the example shown in FIG. 7 the four connecting flanges 13 to 16 are similarly designed, i.e., each has an inner section 17 and a free end section 18 in the form of an "elephant's foot." In FIG. 7, for reasons of greater clarity only, the inner section 17 and the free end section 18 of the first connecting flange 13 are indexed. In what follows, it is mainly the first connecting flange 13 that is described, although however, the corresponding statements apply analogously to the other connecting flanges 14 to 16 as well.

The inner section 17 and the free end section extend in a radial direction r of the drive output shaft 11 (not shown in FIG. 7; see FIG. 1). The inner section 17 can be, for example, around 20 millimeters long. The free end section 18 can for example be around 15 millimeters long. In the example shown in FIG. 7 the inner section 17 and the free end section 18 both have an annular cross-section. In the example shown in FIG. 7, the outer diameter 19 is 32 millimeters within the free end section 18, and thus 10 millimeters more than in the example embodiment shown in FIG. 2. The inner section 17 can for example have a material thickness of 22 millimeters. The cross-section is annular with a central bore 20 for receiving a screw 33 (not shown in FIG. 7—see FIG. 5), which in particular can be of size M8 By means of the screw 33, the housing element 7 can be fixed to the support member 12 of the motor vehicle 1 (see FIGS. 1, 9 and 10).

Inside the inner section 17, the outer diameter 19 has a smaller value than in the free end section 18. Thus, the outer diameter inside the inner section 17 is less than 32 millimeters. In that way, material accumulations, as in the example embodiment shown in FIGS. 4 and 5, are avoided so that the risk of porosity is reduced. In the example embodiment shown in FIG. 7, starting at the inner section 17 the outer diameter increases toward the free end section 18, where it finally reaches the value 32 millimeters at the free end contact area 21. The outer diameter 19 does not increase abruptly but partly in a linear manner, i.e., along a straight lie, and partly along a curved line. Abrupt decreases or increases of the outer diameter 19 are thereby avoided. This contributes toward avoiding stress peaks in the first connecting flange 13.

Figure 8:
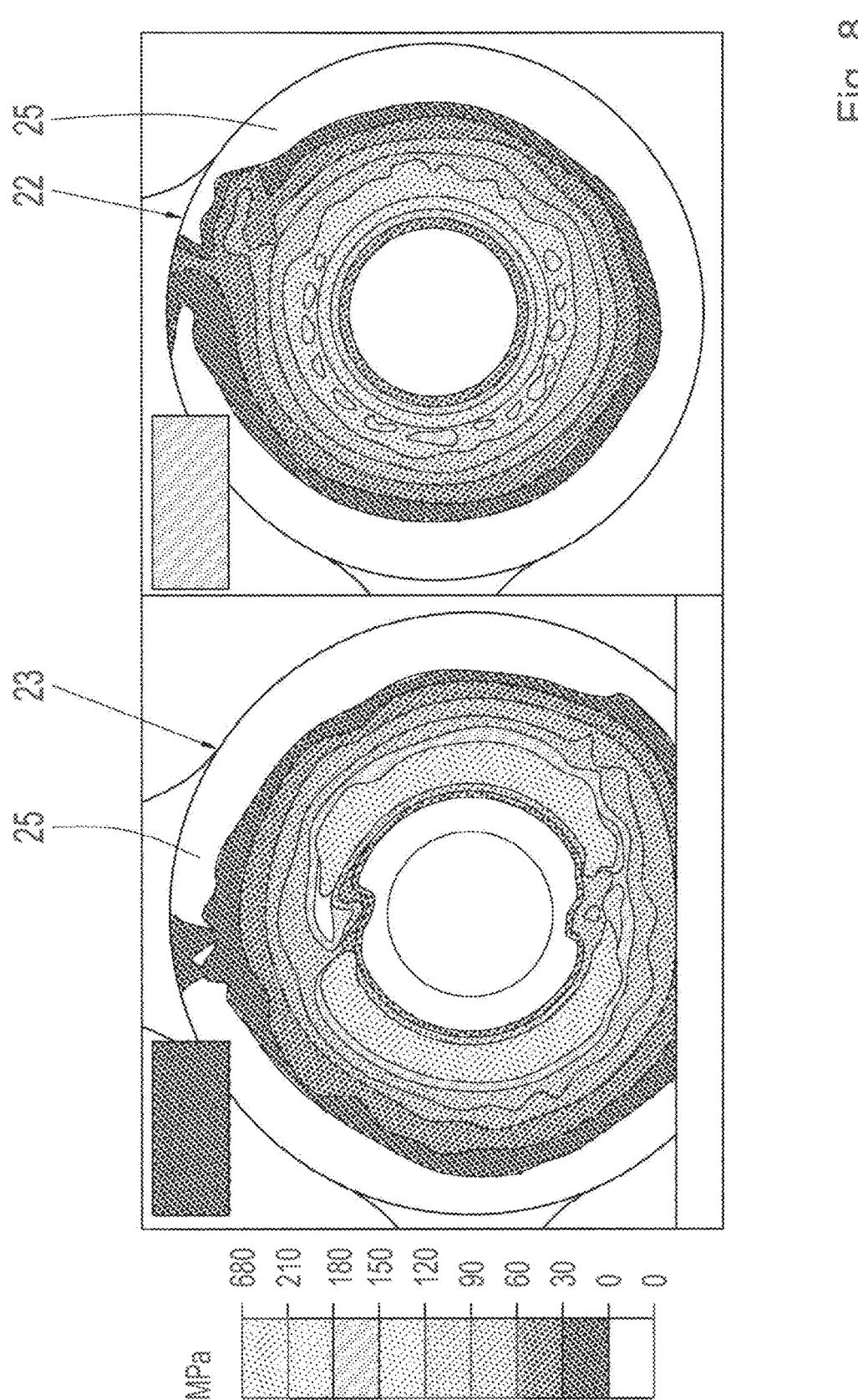

FIG. 8 shows an example of the four connecting flanges 13 to 16, on the right the stresses within the second end contact area 22 of the second connecting flange 14, and on the left the stresses within the third end contact area 23 of the third connecting flange 15. Thanks to the above-described increase of the outer diameter 19 up to 32 millimeters, the risk of porosity in the four connecting flanges 13 to 16 is reduced since excessively large material accumulations are avoided. The weight of the four connecting flanges 13 to 16 is also moderate. Furthermore, given the outer diameter 19 of 32 millimeters the stresses at the edges of the four contact areas 21 to 24 are also relatively moderate, particularly in an edge area 25. The stress values within the edge area 25 are so low that no edge supports are needed for the contact areas 21 to 24 of the free end sections 13 to 16.

FIGS. 9 and 10 show a further example of a housing element 7 with four connecting flanges 13 to 16, by means of which the housing element 7 is fixed to the support member 12 of the motor vehicle 1. As in the example embodiment shown in FIG. 7, the four connecting flanges 13 to 16 according to FIGS. 9 and 10 each have an elephant-foot design in the area of the free end section 18 concerned. The first connecting flange 13 has a first end contact area 21, the second connecting flange 14 has a second end contact area 22, the third connecting flange 15 has a third end contact area 23, and the fourth connecting flange 16 has a fourth end contact area 24. The first end contact area 21 and the second contact area 22 are in a first common plane 27, while the third end contact area 23 and the fourth end contact area 24 are in a second common plane 28.

The first common plane 27 and the second common plane 28 extend at an angle to one another. In the example embodiment shown in FIGS. 9 and 10, the first common plane 27 and the second common plane 28 are each inclined at an equal contact angle 29 relative to the horizontal 30. This, however, is purely an example. Alternatively, the two common planes 27 and 28 can also be inclined at different angled relative to the horizontal 30. The first end contact area 21 and the fourth end contact area 24 can diverge, i.e., they are directed away from and not toward one another. When they are fixed onto the support member 12, the first end contact area 21 and the fourth end contact area 24 are each directed laterally outward relative to the motor vehicle 1.

The first end contact area 21 is in contact with a first contact area 31 of the support member 12. The first contact area 31 extends in the first common plane 27 in such manner that both the first end contact area 21 and also the second end contact area 22 can contact the first contact area 31. Similarly, the fourth end contact area 24 is in contact with a second contact area 32 of the support member 12. The second contact area 32 extends in the second common plane 28 in such manner that both the third end contact area 23 and also the fourth end contact area 24 can contact the second contact area 32.

INDEXES

L1 Longitudinal direction
L11 Longitudinal axis
r Radial direction
Q Transverse direction
1 Motor vehicle
2 Motor
3 Transmission
4 Front axle
5 Rear axle
6 Wheel
7 Housing element
8 Further housing element
9 Drive output side
10 Drive input side
11 Drive output shaft
12 Support member
13 First connecting flange
14 Second connecting flange
15 Third connecting flange
16 Fourth connecting flange
17 Inner section
18 Free end section
19 Outer diameter
20 Bore 21 First end contact area
22 Second end contact area
23 Third end contact area
24 Fourth end contact area
25 Edge area
26 Material accumulation
27 First common plane
28 Second common plane
29 Contact angle
30 Horizontal
32 Second contact area
33 Screw

The invention claimed is:

1. A housing element for a transmission of a motor vehicle, the housing element comprising:
  a first connecting flange, wherein:
    the first connecting flange is configured to be fixed to a support member of the motor vehicle in order to fix the transmission to the motor vehicle;
    the first connecting flange has a free end section;
    the free end section has a first end contact area for contacting the support member; and
    the first end contact area is of a size such that a force exerted on the support member of the motor vehicle deforms the support member only elastically but not plastically;
  wherein:
    the first connecting flange has an inner section;
    the inner section is arranged in a radial direction closer to a drive output shaft than is the free end section;
    the inner section has an annular cross-section; and
    the inner section has an outer diameter that is either equal to or smaller than an outer diameter of the free end section.

2. The housing element according to claim 1, wherein:
the first end contact area has an annular cross-section; and
the annular cross-section of the first end contact area has an outer diameter of at least 32 millimeters.

3. The housing element according to claim 1, wherein:
the inner section is arranged in the radial direction closer to a drive output shaft than is the free end section; and the inner section has the same outer diameter as the free end section.

4. The housing element according to claim 1, further comprising:
  a second connecting flange;
  a third connecting flange; and
  a fourth connecting flange;
  wherein:
    the first end contact area of the first connecting flange and a second end contact area of the second connecting flange extend in a first common plane;
    a third end contact area of the third connecting flange and a fourth end contact area of the fourth connecting flange extend is a second common plane; and
    the first common plane and the second common plane corresponding to two contact areas of the support member extend at an angle to one another.

5. The housing element according to claim 1, wherein:
the transmission is an automatic transmission;
the housing element is arranged on a drive output side of the transmission; and
the housing element encloses the transmission on the drive output side thereof.

6. The housing element according to claim 5, wherein
a drive output shaft of the transmission is arranged in a longitudinal direction of the motor vehicle; and
the support member is arranged transversely to the longitudinal direction.

7. The housing element according to claim 1, wherein;
the inner section extends between 18 and 20 millimeters in the radial direction; and
the free end section extends between 13 and 15 millimeters in the radial direction.

8. The housing element according to claim 7, wherein the inner section extends between 20 and 25 millimeters transversely to the radial direction.

9. The housing element according to claim 1, wherein the outer diameter of the inner section in the radial direction increases toward the free end section to a value of 32 millimeters in the first end contact area.

* * * * *